Figures 1, 2:
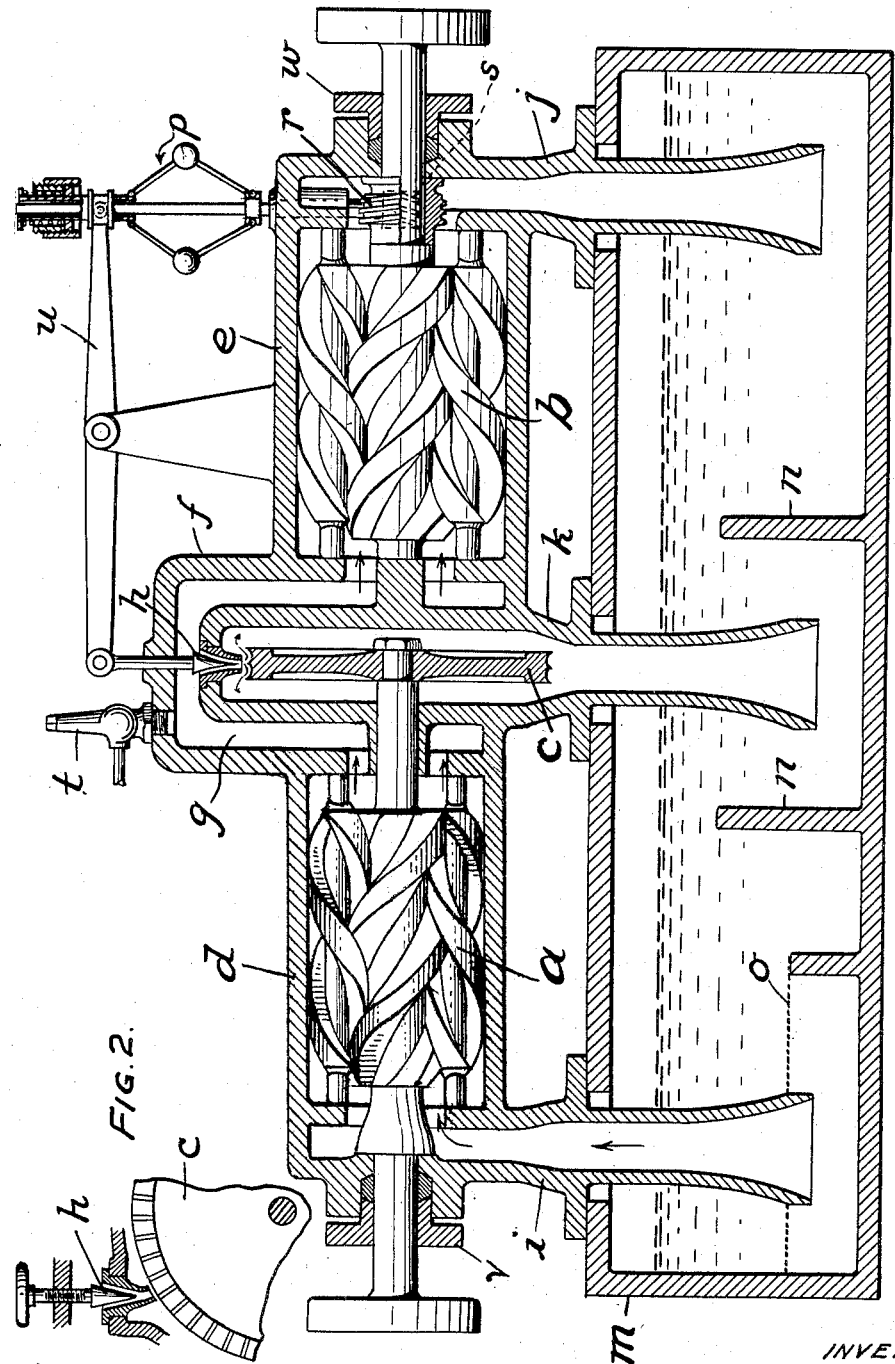

Oct. 1, 1935.  F. W. KENNEDY  2,016,040

POWER TRANSMISSION AND RECLAIMING MECHANISM

Filed April 4, 1932

WITNESS:

INVENTOR
Frank W. Kennedy
BY
ATTORNEYS.

Patented Oct. 1, 1935

2,016,040

UNITED STATES PATENT OFFICE 2,016,040

POWER TRANSMISSION AND RECLAIMING MECHANISM

Frank W. Kennedy, Trenton, N. J., assignor to De Laval Steam Turbine Company, Trenton, N. J., a corporation of New Jersey Application April 4, 1932, Serial No. 603,027

5 Claims. (Cl. 60—53)

The object of the invention is to provide an efficient power transmission means wherein a pump of the positive displacement type, driven from any source of power, delivers liquid to and thereby drives a motor of the positive displacement type. A further object of the invention is to provide means which, when the driving power exceeds the power to be delivered, operates to reclaim the excess power, which would otherwise be wasted. A further object of the invention is to provide, in such a power transmission and reclaiming device, means for regulably varying the speed of the motor. A further object of the invention is to provide, in such a power transmission device, means to maintain a constant speed of the motor irrespective of variations in the power delivered to the pump or variations in the load on the motor. A further object of the invention is to provide an efficient speed reducer between a driving element and a driven element. A further object of the invention is to provide a flexible coupling between a driving element and a driven element whereby shocks that may occur on either the driven element or the driving element will not be transmitted to the other of said elements. Other more specific objects are set forth in the following description of one preferred embodiment of the invention, which is illustrated in the drawing, wherein—

Fig. 1 is a longitudinal vertical section through the device. Fig. 2 is a detail view showing a sector of the power wheel and a nozzle for delivering liquid thereto.

The main elements of the machine comprise a positive displacement screw pump $a$, a positive displacement screw motor $b$, and a power reclaiming wheel $c$ secured to and rotating with the pump.

The pump $a$, which is preferably of the screw type, of which an example may be found in the Montelius Patent No. 1,698,802, comprises a plurality of screws (three being shown) rotatable in a casing $d$. The motor $b$ may be of the same construction as pump $a$ and may be enclosed in a similar casing $e$. Within another casing $f$, housing the power reclaiming wheel $c$, is a conduit $g$, through which oil or other liquid is pumped from pump $a$ to motor $b$. The power wheel $c$ may be of the reaction type, but is preferably of the impulse type with regulating jets in order to utilize to the greatest practicable degree the power from that part of the liquid under pressure flowing from pump to motor which is by-passed through the nozzle regulating valve $h$. Valve $h$ is preferably of the needle valve type, commonly used in water turbines, adapted to regulate the volume of the jet without materially affecting its velocity.

The casings $d$, $e$ and $f$ are preferably constructed as a single casing, with the pump and motor placed back to back therein. Such a casing may be mounted on, or made integral with, hollow pedestals $i$, $j$, $k$, which are mounted on, and extend downward within, a reservoir $m$ for the power transmission liquid. The reservoir may be provided with baffles $n$ to prevent air being entrained in the liquid, and with screens $o$ to prevent dirt and other foreign materials entering the pump.

The course of the liquid is from reservoir $m$ through conduit $i$, the pump chamber, the conduit $g$, the motor chamber and the conduit $j$ back to the reservoir, with a by-pass from the conduit $g$ through the nozzles into the power wheel chamber and thence through conduit $k$ to the reservoir.

The device may be utilized as a variable speed-changing device, in which case the valve $h$ may be adjustable by hand, as indicated in Fig. 2, permitting a predetermined proportion of the liquid to be diverted to the power wheel $c$, thereby reducing, or predetermining, the proportion of the liquid received by motor $b$ and reducing, or predetermining, its speed accordingly. In ordinary commercial work, where the speed is changed the horsepower may also change, but no matter what the combination of speed and horsepower may be, a correct speed may be attained by proper adjustment of the regulating nozzle. Approximately, the speed of the motor will vary as the volume of the liquid passing through it, and its power in proportion to the pressure of the liquid.

The object of the power wheel $c$ is to reclaim a portion of the power that would otherwise be wasted by by-passing part of the liquid supplied by the pump in order to reduce the speed of the motor.

The reclamation of power by the use of the wheel $c$ occurs with various types of driving means for the pump $a$ but in somewhat different fashions for different means. If a direct current motor is used for driving purposes, the reduced torque on the motor occasioned by the aid to its movement contributed by the wheel $c$ will enable it to speed up, thereby increasing the back electromotive force and causing it to draw less current from the line. In the case of an induction motor, slip is decreased and less power is taken by the motor. In the case of a synchronous motor drive, the phase relations are changed so that less power is taken from the line. In cases of other drives similar considerations apply. If a turbine drive is used, for example, the turbine must be equipped with its own governor in the usual fashion, tending to maintain its speed substantially constant. The reduction of torque occasioned by the use of the wheel $c$ will result in a tendency of a driving turbine to speed up with the result that its governor will cut down the supply of driving fuel. A similar action occurs if an internal combustion engine or steam engine is used for driving purposes, the governors in either case serving to maintain the speed constant by closing a throttle or other control to an extent depending upon the aid given by the wheel c.

The device may also be used if it is desired to maintain a constant speed irrespective of power and irrespective of variation in speed of the driving motor. In driving paper machines and other similar machines, this is desirable. The device may be so operated by providing a governor p which may be driven from the motor through a spiral gear r on the motor shaft driving a spiral gear on the driving shaft s of the governor. The governor is connected, by means of an intermediately pivoted lever u, with the stem of the valve h. If the speed of the motor tends to increase beyond or decrease below the speed desired, the valve h will tend to more widely open or throttle respectively, thereby tending to divert a greater or smaller volume of liquid to the power wheel. The governor may be of the variable speed type so that it may be set to maintain any desired speed, which it will do irrespective of variations in power required or variations in speed of the motor, engine or turbine driving pump a. The governor may also be of the constant speed type. Governors of these types are known in the art, so that a detailed description is not required.

The device may also be used as a speed reducer, as the speeds of the pump and motor will be inversely proportionate to their respective volumes which may differ as indicated in Fig. 1. For example, if the area or volume of pump a be assumed to be one and the area or volume of motor b be assumed to be three, the relative speeds of the two will be in the proportion of 3 to 1. Thus, any reasonable speed reduction may be attained, and at the same time the speed of the motor may be varied by varying the volume of liquid by-passing to the power wheel.

The device may also be used as a flexible coupling where it is desired to avoid the transmission to the driving unit of heavy shocks to which the driven unit may be subjected. Inasmuch as there are no metallic or positive contacts between the driving element and the driven element, any shocks received by the motor will not be transmitted to the pump and therefore will not be transmitted to the driving motor, turbine or engine.

While the device is shown as built in a single casing, this is not necessary, and any method of piping the liquid from the pump to the motor and back to the pump may be employed.

It is preferred to equip the power wheel casing section with a relief valve t, which can be set for any predetermined pressure and acts as a safety valve in case of accident or jamming on the driven machine. In such case the relief valve would prevent the pump building up an abnormal pressure that might damage the casing, or (due to excess power developed) damage the driven machine. The relief valve also permits stoppage through accident of the driven machine without overloading the driven motor beyond the predetermined amount fixed by setting the pressure at which the relief valve will open.

By placing the motor and pump back to back in a single casing, as shown and hereinbefore described, all stuffing boxes under pressure are eliminated; and inasmuch as it may be desirable to use comparatively high pressures in order to keep the size of the device within reasonable limits, this arrangement is advantageous.

Both the stuffing box v on the pump and the stuffing box w on motor b are under a low vacuum.

What I claim and desire to protect by Letters Patent is:

1. Means for transmitting power and regulating the speed of a driven element, comprising a positive displacement pump, a positive displacement motor adapted to be driven by fluid under pressure from the pump, a power wheel in driving relation with the pump, means providing a by-pass to the power wheel for fluid being pumped from the pump to the motor, a speed governor in driving relation with the motor, and means controlled by the governor to regulate the proportion of liquid by-passed to the power wheel, whereby the speed of the motor may be maintained constant notwithstanding variations in the power transmitted by the pump or in the load on the motor.

2. Power transmission means including a positive displacement pump, a positive displacement motor, means for leading fluid from the pump to the motor to drive the latter, a governor driven by the motor, and means controlled by the governor to divert from the motor variable amounts of the fluid discharged from the pump to thereby maintain the motor speed substantially constant notwithstanding variations in the speed of the pump.

3. Power transmission means including a positive displacement pump, a positive displacement motor, means for leading fluid from the pump to the motor to drive the latter, a power wheel in driving relation with the pump, a governor driven by the motor, and means controlled by the governor to divert from the motor variable amounts of the fluid discharged from the pump and direct such fluid to drive the power wheel, whereby the motor speed is maintained substantially constant notwithstanding variations in speed of the pump, and whereby some of the energy of the diverted fluid is reclaimed.

4. Power transmission means including a positive displacement pump, comprising a plurality of screws, a positive displacement motor, comprising a plurality of screws, means for leading fluid from the pump to the motor to drive the latter, a governor driven by the motor, and means controlled by the governor to divert from the motor variable amounts of the fluid discharged from the pump to thereby maintain the motor speed substantially constant notwithstanding variations in the speed of the pump.

5. Power transmission means including a positive displacement pump comprising a plurality of screws, a positive displacement motor comprising a plurality of screws, means for leading fluid from the pump to the motor to drive the latter, a power wheel in driving relation with the pump, a governor driven by the motor, and means controlled by the governor to divert from the motor variable amounts of the fluid discharged from the pump and direct such fluid to drive the power wheel, whereby the motor speed is maintained substantially constant notwithstanding variations in speed of the pump, and whereby some of the energy of the diverted fluid is reclaimed.

FRANK W. KENNEDY.